(12) United States Patent
Park et al.

(10) Patent No.: US 11,834,094 B2
(45) Date of Patent: Dec. 5, 2023

(54) INTEGRATED MEMORY SYSTEM FOR DRIVING POSITION AND METHOD OF CONTROLLING SAME

(71) Applicants: Hyundai Motor Company, Seoul (KR); Kia Motors Corporation, Seoul (KR); Yura Corporation Co., Ltd., Gyeonggi-do (KR)

(72) Inventors: Se Hoon Park, Gyeonggi-do (KR); In Sik Hwang, Gyeonggi-do (KR)

(73) Assignees: Hyundai Motor Company, Seoul (KR); Kia Motors Corporation, Seoul (KR); Yura Corporation Co., Ltd., Gyeonggi-do (KR)

( * ) Notice: Subject to any disclaimer, the term of this patent is extended or adjusted under 35 U.S.C. 154(b) by 553 days.

(21) Appl. No.: 17/092,905

(22) Filed: Nov. 9, 2020

(65) Prior Publication Data

US 2022/0017136 A1 Jan. 20, 2022

(30) Foreign Application Priority Data

Jul. 15, 2020 (KR) .................. 10-2020-0087796

(51) Int. Cl.
*B62D 1/181* (2006.01)
*B60R 1/06* (2006.01)
*B60K 35/00* (2006.01)
*B60Q 3/80* (2017.01)
*B60Q 9/00* (2006.01)

(52) U.S. Cl.
CPC .............. *B62D 1/181* (2013.01); *B60K 35/00* (2013.01); *B60Q 3/80* (2017.02); *B60R 1/06* (2013.01); *B60K 2370/152* (2019.05); *B60K 2370/349* (2019.05); *B60Q 9/00* (2013.01)

(58) Field of Classification Search
CPC . B62D 1/181; B60Q 3/80; B60Q 9/00; B60K 35/00; B60K 2370/349; B60K 2370/152; B60R 1/06
See application file for complete search history.

(56) References Cited

U.S. PATENT DOCUMENTS

2007/0219691 A1* 9/2007 Fukuba ................. B62D 6/008
701/42

FOREIGN PATENT DOCUMENTS

KR 970036373 A 7/1997

\* cited by examiner

*Primary Examiner* — Michael D Lang
(74) *Attorney, Agent, or Firm* — Fox Rothschild LLP

(57) ABSTRACT

An integrated memory system for a driving position is provided. The integrated memory system includes a steering column having an inner column, and an outer column that is movable in an axis direction relative to the inner column. A position detecting unit including a plurality of detection positions detects a relative position of the outer column with respect to the inner column in response to a movement of the outer column and a controller is connected to the position detecting unit.

12 Claims, 13 Drawing Sheets

INTEGRATED MEMORY SYSTEM FOR DRIVING POSITION AND METHOD OF CONTROLLING SAME

CROSS-REFERENCE TO RELATED APPLICATION

This application claims priority to and the benefit of Korean Patent Application No. 10-2020-0087796 filed on Jul. 15, 2020, the entire contents of which are incorporated herein by reference.

TECHNICAL FIELD

The present disclosure relates to an integrated memory system for a driving position and a method of controlling the same, and more particularly, to an integrated memory system for a driving position and a method of controlling the same, which are capable of recalling or retrieving respective driver setting data suitable for a driver's body type or demand by adjusting a steering column in a telescopic manner.

BACKGROUND ART

Recently, a vehicle has been equipped with an integrated memory system (IMS) that may set and store a position of a driver seat, positions of outside mirrors, a position of a steering wheel, and the like as "driver setting data" based on a body type or demand of each driver, and then automatically adjust the position of the driver seat, the positions of the outside mirrors, the position of the steering wheel, and the like based on the driver setting data set and stored by an operation of a switch. The integrated memory system provides convenience to multiple drivers by adjusting driving positions based on the driver's characteristics when the multiple drivers operates a single vehicle.

The integrated memory system in the related art includes a manipulation unit positioned at a position adjacent to the driver seat, and an integrated control unit (ICU) electrically connected to the manipulation unit. The manipulation unit includes a setting switch and a plurality of memory switches, and the integrated control unit including a memory and a processor. The integrated control unit is configured to operate a driver seat driving motor for moving the driver seat, an outside mirror driving motor for moving the outside mirror, a driving motor for adjusting the steering column in a telescopic manner, and a driving motor for adjusting a tilt of the steering column.

Each driver adjusts the position of the driver seat, the position of the outside mirror, and the position of the steering column based on his/her body type, manipulates the setting switch to set the adjusted position of the driver seat, the adjusted position of the outside mirror, the adjusted position of the steering wheel, and the like as "the driver setting data" conforming to a body type or demand of each driver, and then manipulates any one of the plurality of memory switches to store the adjusted position of the driver seat, the adjusted position of the outside mirror, the adjusted position of the steering wheel, and the like in the memory of the integrated control unit.

Accordingly, the plurality of driver setting data is set to correspond to the plurality of memory switches by the processor of the integrated control unit, and the plurality of driver setting data is stored in the memory of the integrated control unit. The respective "driver setting data" are the data including the positions of the driver seat, the positions of the outside mirror, the position of the steering column (steering wheel), and the like which have been adjusted based on the body type or intention of each of the drivers, and the plurality of "driver setting data" is set to individually conform to the plurality of drivers and then stored. When each driver selects the corresponding memory switch among the plurality of memory switches, the processor of the integrated control unit may operate the driver seat driving motor, the outside mirror driving motor, the driving motor for adjusting the steering column in a telescopic manner, the driving motor for adjusting a tilt of the steering column, and the like in accordance with the "driver setting data" conforming to the selected memory switch, such that the "driver setting data" corresponding to the selected memory switch are recalled or retrieved.

Meanwhile, the position of the steering wheel is adjusted by the driving motor for adjusting the steering column in a telescopic manner and the driving motor for adjusting a tilt of the steering column. In other words, a steering column assembly in the related art is configured such that the position of the steering wheel is adjusted by the two driving motors, which causes a drawback in that manufacturing costs are relatively increased. Therefore, the integrated memory system in the related art operates the two driving motors individually, which makes control logic thereof complex, thus frequently causing a problem in that the position of the steering wheel is unable to be adjusted precisely.

In addition, the integrated memory system in the related art is configured such that the manipulation unit including the setting switch and the plurality of memory switches is disposed in the vicinity of the driver seat, and as a result, manufacturing costs and the number of assembly processes increase. Furthermore, since the setting switch and the memory switches need to be manipulated to set, store, recall, or retrieve the driver setting data, convenience of manipulation deteriorates.

The above information disclosed in this section is merely for enhancement of understanding of the background of the invention and therefore it may contain information that does not form the prior art that is already known in this country to a person of ordinary skill in the art.

SUMMARY

The present disclosure provides an integrated memory system for a driving position, which sets and stores driver setting data (including information about a position of a driver seat, information about a position of an outside mirror, information about brightness of a display, information about brightness of lights, and the like) suitable for a driver's body type or demand by adjusting a steering column in a telescopic manner, and recalls or retrieves the set and stored driver setting data.

In order to achieve the above-mentioned object, one aspect of the present disclosure provides an integrated memory system for a driving position that may include: a steering column having an inner column, and an outer column configured to be movable in an axis direction relative to the inner column; a position detecting unit having a plurality of detection positions and configured to detect a relative position of the outer column with respect to the inner column in response to a movement of the outer column; and a controller connected to the position detecting unit and configured to set and store a plurality of driver setting data individually corresponding to the plurality of detection positions. The driver setting data may include information about positions of a driver seat which correspond to the respective detection positions.

The controller may be configured to generate a control signal for recalling or retrieving the driver setting data selected from the plurality of driver setting data. The driver setting data may further include information about positions of an outside mirror corresponding to the respective detection positions, information about brightness of one or more displays corresponding to the respective detection positions, and information of brightness of one or more lights corresponding to the respective detection positions.

The position detecting unit may include: a housing mounted on the outer column; a plurality of tact switches mounted in the housing; and a push member connected to a vehicle body and configured to selectively push a button of any one tact switch among the plurality of tact switches in response to the movement of the outer column. A longitudinal axis of the housing may be parallel to a longitudinal axis of the outer column.

The plurality of tact switches may be spaced apart from one another at an equal interval in a longitudinal direction of the outer column. The plurality of detection positions may be individually defined by the plurality of tact switches. The push member may be connected to the vehicle body through a bracket and spaced apart from the outer column. The outer column may have two mounting legs spaced apart from each other, and the housing may be separably coupled to the two mounting legs.

Each of the mounting legs may have a mounting groove, and the housing may include a plurality of lances each having a mounting hook to be coupled to the mounting groove. The push member may be connected to the bracket via a fixing pin, each of the mounting legs may have a slot that extends in a longitudinal direction of the outer column, and the fixing pin may be guided along the slot of each of the mounting legs when the outer column moves.

Another aspect of the present disclosure provides a method of controlling an integrated memory system for a driving position, the integrated memory system including: an inner column; and an outer column movable in an axis direction relative to the inner column, the method including: detecting, by a controller, a relative position of the outer column with respect to the inner column in accordance with a movement of the outer column based on a plurality of detection positions; and setting, by the controller, driver setting data based on the respective detection positions, in which the driver setting data may include information about positions of a driver seat corresponding to the respective detection positions.

The driver setting data corresponding to any one of the detection positions may be selected when the relative position of the outer column with respect to the inner column is detected based on any one detection position among the plurality of detection positions, and the selected driver setting data may be recalled or retrieved. The driver setting data may further include information about positions of an outside mirror corresponding to the respective detection positions, information about brightness of one or more displays corresponding to the respective detection positions, and information of brightness of one or more lights corresponding to the respective detection positions.

According to the present disclosure, with the adjustment of the steering column in a telescopic manner, it may be possible to set and store the driver setting data (e.g., information about the driver seat, the outside mirror, brightness of the display, and brightness of the light) suitable for the driver's body type and recall or retrieve the set and stored driver setting data, such that it may be possible to remove the driving motor for moving the steering column in the related art and remove a separate switch assembly for setting and recalling or retrieving the driver setting data, thereby reducing manufacturing costs. In particular, with the adjustment of the steering column in a telescopic manner, it may be possible to set, store, recall, or retrieve the driver setting data, such that an operation of a separate switch is not required unlike the related art, thereby improving convenience of manipulation.

BRIEF DESCRIPTION OF THE DRAWINGS

A brief description of each drawing is provided to more sufficiently understand drawings used in the detailed description of the present disclosure.

DETAILED DESCRIPTION

Figure 1:
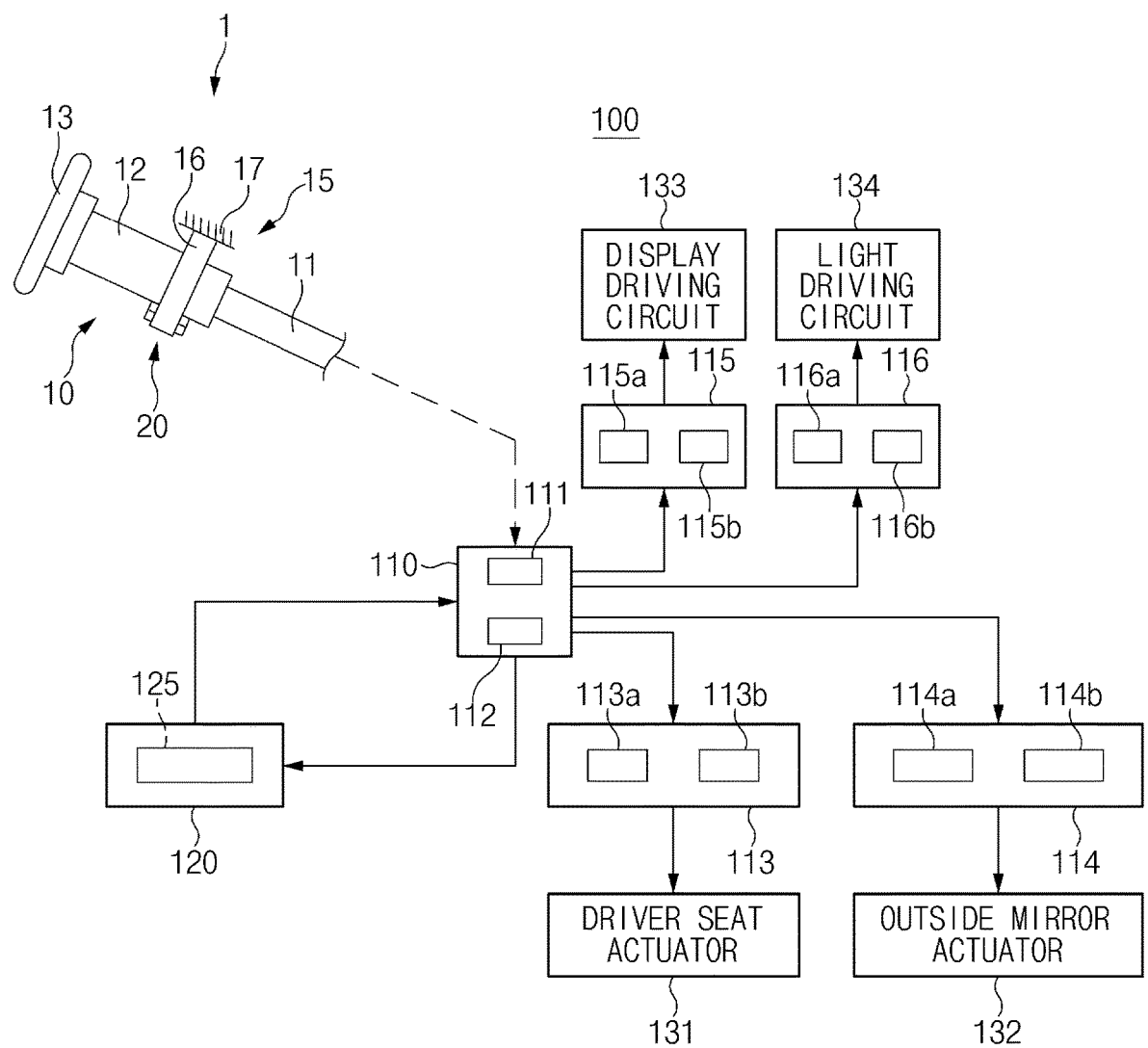
FIG. 1 is a view illustrating an integrated memory system for a driving position according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the illustrative drawings. In denoting reference numerals to constituent elements of the respective drawings, it should be noted that the same constituent elements will be designated by the same reference numerals, if possible, even though the constituent elements are illustrated in different drawings. Further, in the following description of the exemplary embodiments of the present disclosure, a detailed description of publicly known configurations or functions incorporated herein will be omitted when it is determined that the detailed description obscures the subject matters of the exemplary embodiments of the present disclosure.

In addition, the terms first, second, A, B, (a), and (b) may be used to describe constituent elements of the exemplary embodiments of the present disclosure. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present application.

Referring to FIGS. 1 to 4, an integrated memory system 100 for a driving position according to an exemplary embodiment of the present disclosure may include a steering column 10 including an inner column 11 and an outer column 12 movable relative to the inner column 11, a position detecting unit 20 configured to detect a position of the outer column 12, and a controller 110 connected to the position detecting unit 20 (e.g., a position detection sensor).

A steering column assembly 1 may include the steering column 10 connected to and supported on a vehicle body by a tilting/telescopic adjustment mechanism 15. The steering column 10 may include the inner column 11 and the outer column 12 that is movable relative to the inner column 11 in an axis direction of the steering column 10. A lower end of the inner column 11 may be connected to a steering linkage, and an upper end of the inner column 11 may be received in the outer column 12. The outer column 12 may have a hollow pipe shape, and a steering wheel 13 may be connected to an upper end of the outer column 12. As the outer column 12 moves in the axis direction relative to the inner column 11, a length of the steering column 10 may be adjusted in a telescopic manner (e.g., extendably or retractably), to thus adjust a position of the steering wheel 13.

The tilting/telescopic adjustment mechanism 15 may be configured to allow the steering column 10 to be adjusted in a telescopic manner and to allow a tilt of the steering column 10 to be adjusted. The tilting/telescopic adjustment mechanism 15 may include a bracket 16 fixed to a cowl bar 17 or the like of the vehicle body, and a lock lever 18 connected to the bracket 16. The bracket 16 is configured to surround the outer column 12 of the steering column 10, and the outer column 12 of the steering column 10 may be connected to and supported on the vehicle body by the bracket 16.

Figure 3:
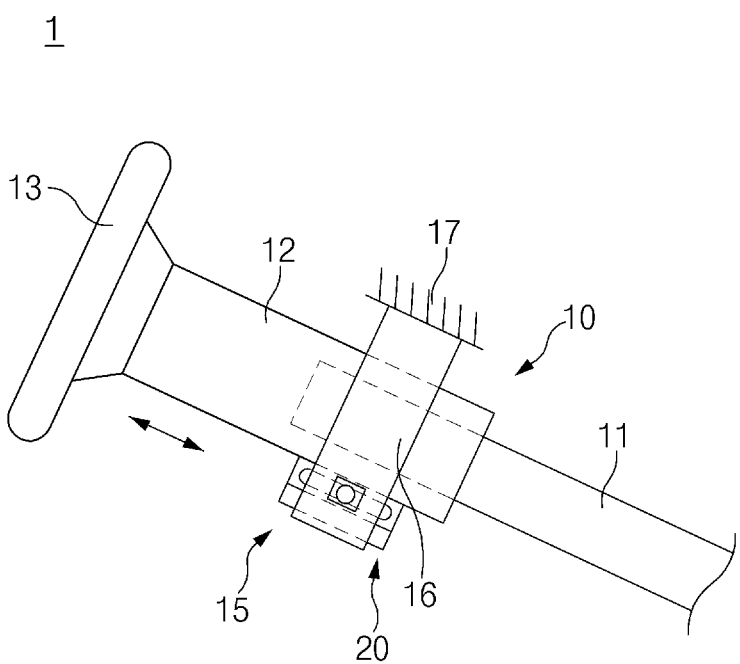
FIG. 3 is a view illustrating a steering column assembly of the integrated memory system for a driving position according to the exemplary embodiment of the present disclosure.
Figure 4:
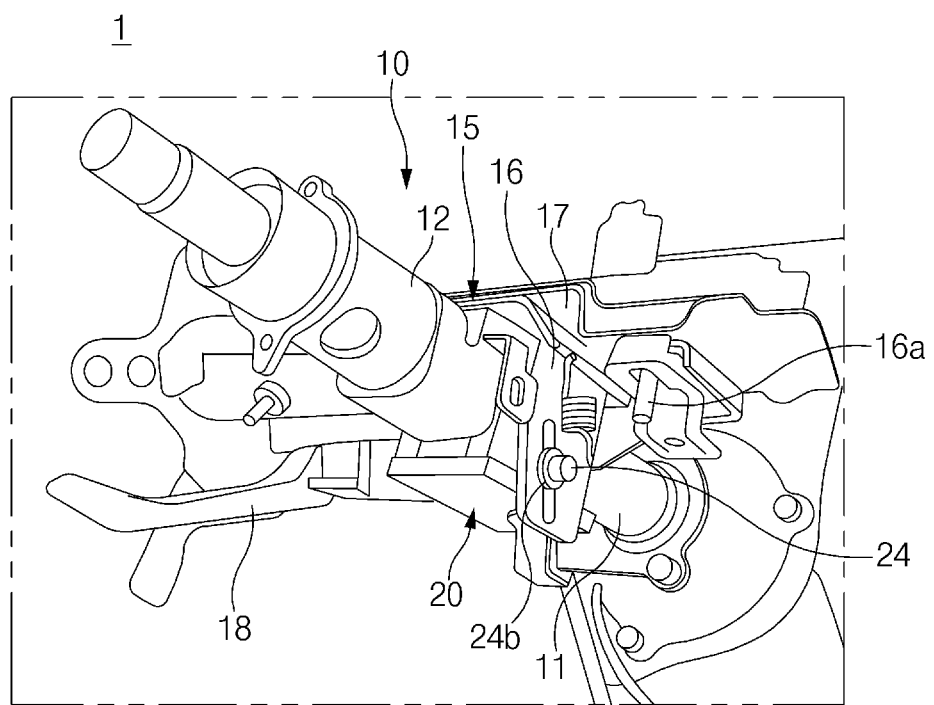
FIG. 4 is a perspective view illustrating the steering column assembly of the integrated memory system for a driving position according to the exemplary embodiment of the present disclosure.

Referring to FIG. 3, the bracket 16 may be fixed to the cowl bar 17 of the vehicle body by a bolt 16a or the like, and the lock lever 18 may be mounted on the bracket 16 to lock or unlock the steering column 10. The position detecting unit 20 may be configured to detect a relative position of the outer column 12 with respect to the inner column 11 when the steering column 10 is adjusted in a telescopic manner (e.g., when the length of the steering column 10 is adjusted).

According to the exemplary embodiment, the position detecting unit 20 may include a housing 26 coupled to the outer column 12, a printed circuit board 28 disposed in the housing 26, a plurality of tact switches 27a, 27b, 27c, and 27d mounted on the printed circuit board 28, and a push member 23 configured to selectively push a button of any one of the plurality of tact switches 27a, 27b, 27c, and 27d in response to a movement of the outer column 12.

The outer column 12 may have two mounting legs 21, and the two mounting legs 21 may be spaced apart from each other along a width of the outer column 12 thus defining a passageway 22 between the two mounting legs 21. Each of the mounting legs 21 may protrude to the outside of the outer column 12. Each of the mounting legs 21 may extend by a predetermined length in a longitudinal direction of the outer column 12. Each of the mounting legs 21 may have a slot 21a that extends in the longitudinal direction of the outer column 12. Each of the mounting legs 21 may have mounting grooves 21b individually formed at both ends of the mounting leg 21.

As the housing 26 is separably coupled to the two mounting legs 21, the housing 26 may be coupled to the outer column 12. The housing 26 may have a rectangular parallelepiped shape having a length relatively greater than a width thereof. A width of the housing 26 may correspond to a width between the two mounting legs 21. The housing 26 may be coupled to the two mounting legs 21 so that a longitudinal axis of the housing 26 is parallel to a longitudinal axis of the outer column 12.

Figure 5:
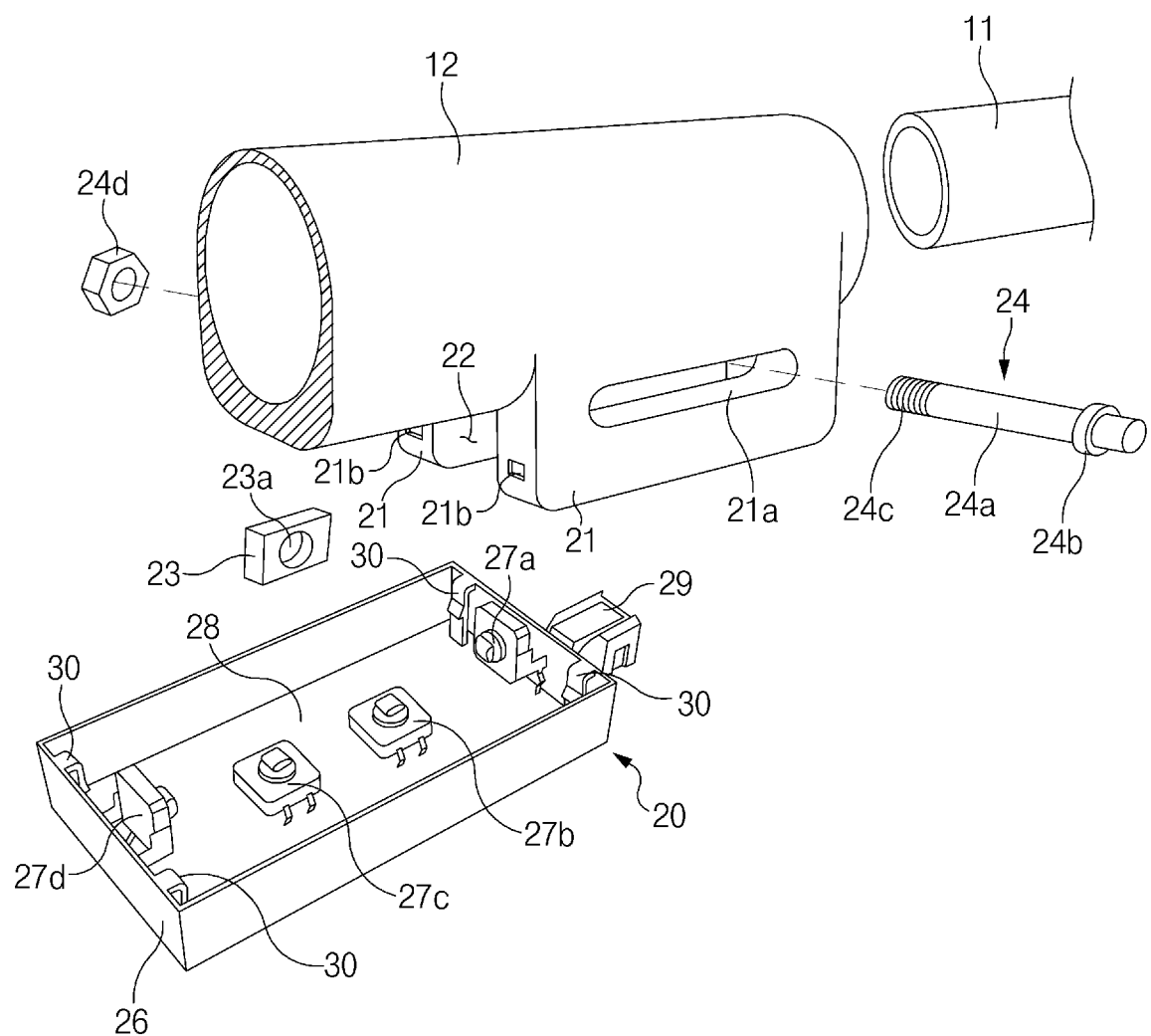
FIG. 5 is an exploded perspective view illustrating a steering column of the steering column assembly and a position detecting unit of the integrated memory system for a driving position according to the exemplary embodiment of the present disclosure.
Figure 6:
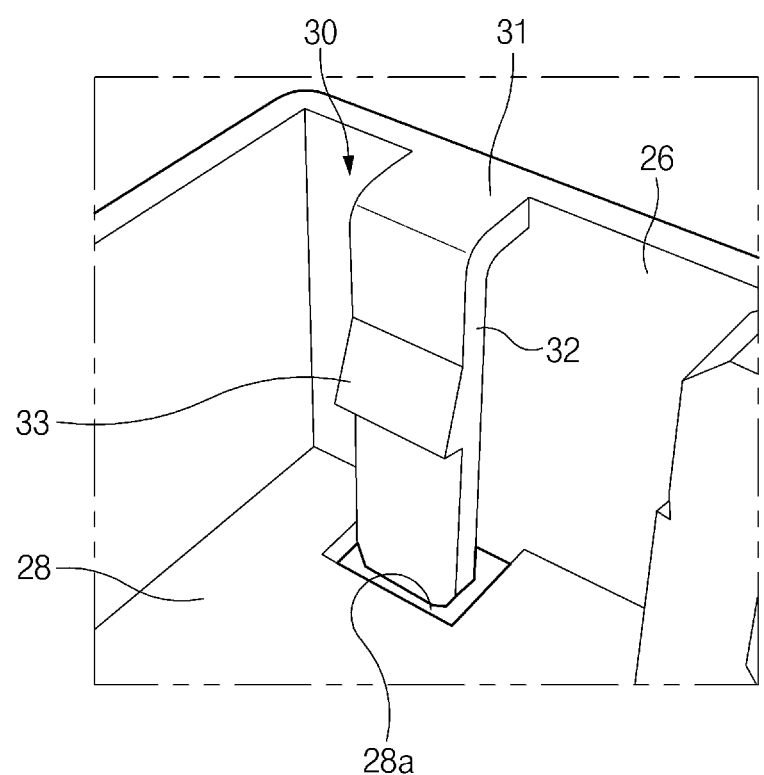
FIG. 6 is a view illustrating a lance provided on an end wall of a housing of the position detecting unit illustrated in FIG. 5.
Figure 7:
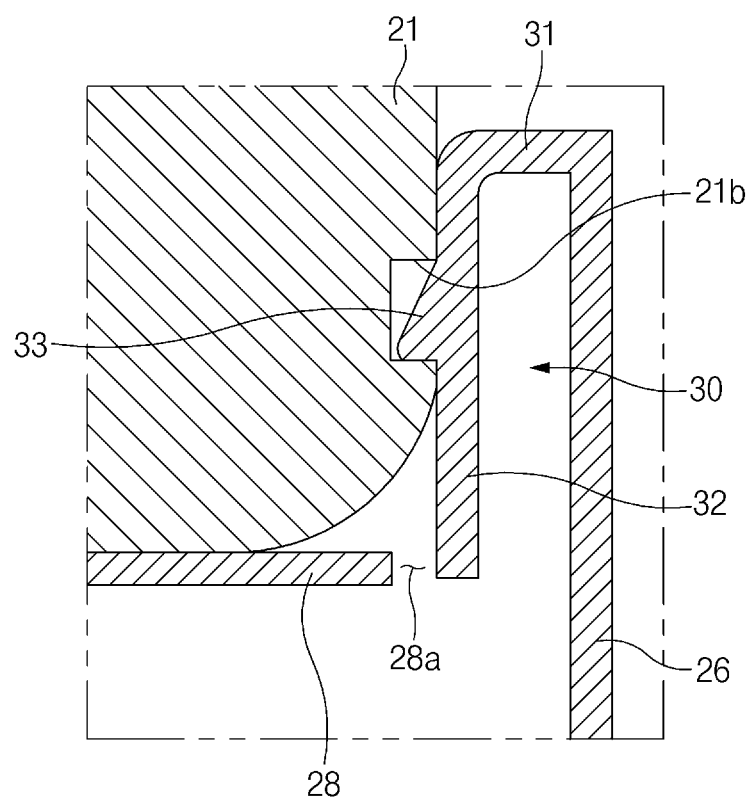
FIG. 7 is a view illustrating a structure in which the position detecting unit illustrated in FIG. 6 is mounted on a mounting leg of an outer column by means of a mounting hook of the lance and a mounting groove of the mounting leg.

Referring to FIGS. 5 to 7, a plurality of lances 30 may be formed on respective end walls of the housing 26, and each of the lances 30 may be configured to be elastically deformed with respect to each of the end walls of the housing 26. Specifically, each of the lances 30 may include a first extension portion 31 that extends from each of the end walls of the housing 26 toward an internal space of the housing 26, and a second extension portion 32 that extends from the first extension portion 31 toward the printed circuit board 28. The second extension portion 32 may be orthogonal to the first extension portion 31, and the second extension portion 32 may extend in a cantilevered manner from the first extension portion 31, such that each of the lances 30 may be elastically deformed with respect to each of the end walls of the housing 26.

The second extension portion 32 may have a mounting hook 33 that protrudes toward the internal space of the housing 26. When the housing 26 is assembled to the two mounting legs 21, the lances 30 of the housing 26 may be elastically deformed, and the mounting hooks 33 of the lances 30 may be coupled to the mounting grooves 21b of the mounting legs 21, respectively, as illustrated in FIG. 7.

The printed circuit board 28 may be disposed in the internal space of the housing 26, and a connector 29 may be electrically connected to a circuit pattern of the printed circuit board 28. The connector 29 may be connected to the controller 110 through an electric wire or the like. Therefore, the plurality of tact switches 27a, 27b, 27c, and 27d may be electrically connected to the controller 110 through the printed circuit board 28 and the connector 29. The printed circuit board 28 may have through holes 28a (e.g., bores) into which free ends of the second extension portions 32 of the lances 30 are inserted, respectively, to prevent interference between the lances 30 and the printed circuit board 28.

Each of the tact switches 27a, 27b, 27c, and 27d may be electrically connected to the circuit pattern of the printed circuit board 28, to electrically connect each of the tact switches 27a, 27b, 27c, and 27d to the connector 29 through the circuit pattern of the printed circuit board 28. When any one of the plurality of tact switches 27a, 27b, 27c, and 27d is turned on by the push member 23 to be described below in response to the movement of the outer column 12, a turn-on signal related to the corresponding tact switch 27a, 27b, 27c, or 27d, may be transmitted to the controller 110 through the connector 29, such that the controller 110 may be configured to detect the relative position of the outer column 12 with respect to the bracket 16 or the inner column 11. The plurality of tact switches 27a, 27b, 27c, and 27d may be spaced apart from one another at an equal interval in the longitudinal direction of the housing 26 and the longitudinal direction of the outer column 12. For example, an interval between the adjacent two tact switches may be about 25 mm.

Referring to FIG. 5, the plurality of tact switches 27a, 27b, 27c, and 27d may include a first tact switch 27a disposed closest to the lower end of the inner column 11, a second tact switch 27b spaced apart from the first tact switch 27a, a third tact switch 27c spaced apart from the second tact switch 27b, and a fourth tact switch 27d spaced apart from the third tact switch 27c. The second tact switch 27b may be positioned to be second closest to the lower end of the inner column 11, the third tact switch 27c may be positioned to be third closest to the lower end of the inner column 11, and the fourth tact switch 27d may be positioned farthest from the lower end of the inner column 11.

The push member 23 may be spaced apart from the outer column 12, and to prevent the push member 23 from being indirect contact with the outer column 12 and to prevent the push member 23 from obstructing the movement of the outer column 12. According to the exemplary embodiment, the push member 23 may be positioned in the passageway 22 defined between the two mounting legs 21 to prevent the push member 23 from being in direct contact with the outer column 12.

The push member 23 may be connected to the vehicle body through the bracket 16. Specifically, the push member 23 may be coupled to the bracket 16 via a fixing pin 24, and the push member 23 may have a mounting hole 23b (e.g. mounting aperture) through which the fixing pin 24 passes. The fixing pin 24 may have a rod 24a, a head portion 24b formed at a first end of the rod 24a, and a threaded portion 24c formed at a second end of the rod 24a. The rod 24a may extend in a direction (i.e., a width direction of the outer column 12) orthogonal to the longitudinal direction of the outer column 12, and the rod 24a may be mounted across the two mounting legs 21. The head portion 24b may have a greater diameter than the slot 21a of the mounting leg 21.

The rod 24a may pass through the slots 21a of the two mounting legs 21. As the rod 24a passes through the slots 21a of the two mounting legs 21 and the mounting hole 23b of the push member 23, the head portion 24b may be supported on one mounting leg 21. Further, since a nut 24d is coupled to the threaded portion 24c, the push member 23 may be connected to and supported on the bracket 16 by the fixing pin 24. The fixing pin 24 may be guided along the slots 21a of the mounting legs 21 while the outer column 12 moves to prevent the push member 23 from obstructing the movement of the outer column 12.

Referring to FIGS. 8 to 11, when the outer column 12 moves relative to the inner column 11 in the axis direction of the steering column 10 to adjust the steering column 10 in a telescopic manner, the push member 23 pushes the button of any one of the plurality of tact switches 27a, 27b, 27c, and 27d to thus turn on the corresponding tact switch, and the corresponding signal may be transmitted to the controller 110 through the circuit pattern of the printed circuit board 28 and the connector 29. In other words, the push member 23 may be connected to the vehicle body through the bracket 16, the plurality of tact switches 27a, 27b, 27c, and 27d may be connected to the outer column 12 through the housing 26, and the housing 26 and the plurality of tact switches 27a, 27b, 27c, and 27d may be moved together with the outer column 12 when the outer column 12 moves, such that the push member 23 may push any one of the plurality of tact switches 27a, 27b, 27c, and 27d, and as a result, the relative position of the outer column 12 with respect to the inner column 11 may be detected.

In particular, the position detecting unit 20 may include a plurality of detection positions P1, P2, P3, and P4 at which the relative positions of the outer column 12 with respect to the inner column 11 are detected. The plurality of detection positions P1, P2, P3, and P4 may be individually defined by the plurality of tact switches 27a, 27b, 27c, and 27d, and the plurality of detection positions P1, P2, P3, and P4 may be spaced apart from one another at intervals corresponding to the intervals between the tact switches 27a, 27b, 27c, and 27d. For example, each of the detection positions may be an imaginary vertical axis that extends from each of the tact switches corresponding to the detection positions. The first detection position P1 may be an imaginary vertical axis extending from the first tact switch 27a. When the push member 23 pushes the button of the first tact switch 27a, the controller 110 may be configured to detect the relative position of the outer column 12 with respect to the inner column 11 based on the "first detection position P1".

The second detection position P2 may be an imaginary vertical axis that extends from the second tact switch 27b. When the push member 23 pushes the button of the second tact switch 27b, the controller 110 may be configured to detect the relative position of the outer column 12 with respect to the inner column 11 based on the "second detection position P2". The third detection position P3 may be an imaginary vertical axis that extends from the third tact switch 27c. When the push member 23 pushes the button of the third tact switch 27c, the controller 110 may be configured to detect the relative position of the outer column 12 with respect to the inner column 11 based on the "third detection position P3".

The fourth detection position P4 may be an imaginary vertical axis that extends from the fourth tact switch 27d. When the push member 23 pushes the button of the fourth tact switch 27d, the controller 110 may be configured to detect the relative position of the outer column 12 with respect to the inner column 11 based on the "fourth detection position P4". In other words, the push member 23 selectively turns on any one of the tact switches 27a, 27b, 27c, and 27d in response to the movement of the outer column 12, such that the controller 110 may be configured to detect the relative position of the outer column 12 with respect to the inner column 11 based on which one of the tact switches 27a, 27b, 27c, and 27d is turned on.

Figure 8:
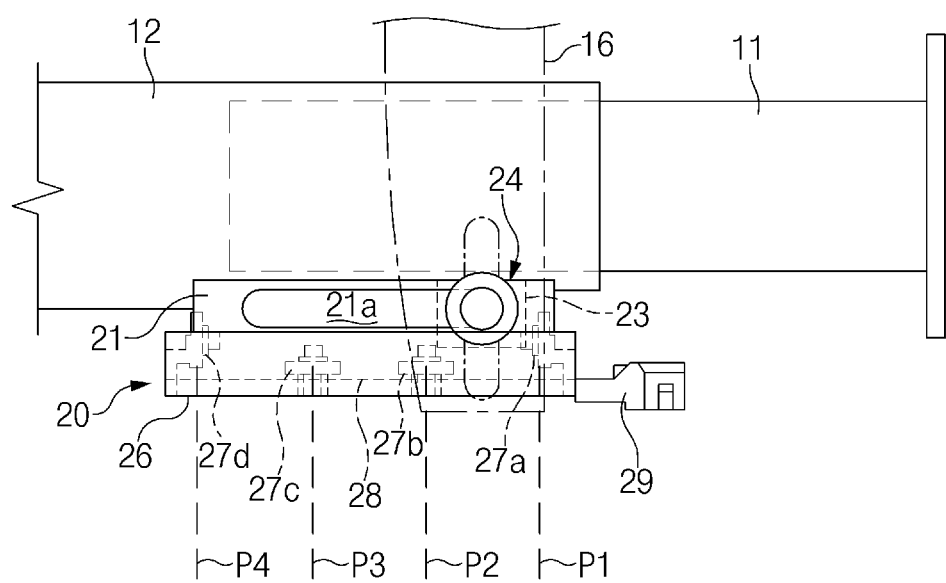
FIG. 8 is a view illustrating a state in which a first tact switch is turned on as the outer column moves in the steering column assembly of the integrated memory system for a driving position according to the exemplary embodiment of the present disclosure.

Referring to FIG. 8, when the outer column 12 moves toward the inner column 11 so that a length of the steering column 10 becomes shortest, the push member 23 may push the button of the first tact switch 27a, which is positioned closest to the lower end of the inner column 11 among the plurality of tact switches 27a, 27b, 27c, and 27d to thus turn on the first tact switch 27a. Accordingly, the controller 110 may be configured to detect that the outer column 12 is positioned at the first detection position closest to the lower end of the inner column 11.

Figure 9:
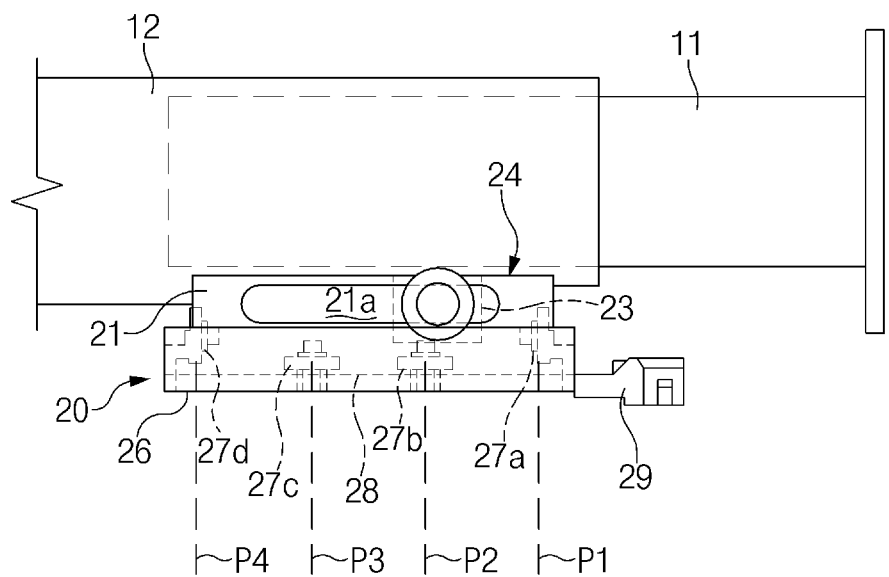
FIG. 9 is a view illustrating a state in which a second tact switch is turned on as the outer column moves in the steering column assembly of the integrated memory system for a driving position according to the exemplary embodiment of the present disclosure.

Referring to FIG. 9, when the outer column 12 moves toward the inner column 11 so that the length of the steering column 10 is second shortest, the push member 23 may push the button of the second tact switch 27b, which is positioned to be second closest to the inner column 11 among the plurality of tact switches 27a, 27b, 27c, and 27d to thus turn on the second tact switch 27b. Accordingly, the controller 110 may be configured to detect that the outer column 12 is positioned at the second detection position which is second closest to the lower end of the inner column 11.

Figure 10:
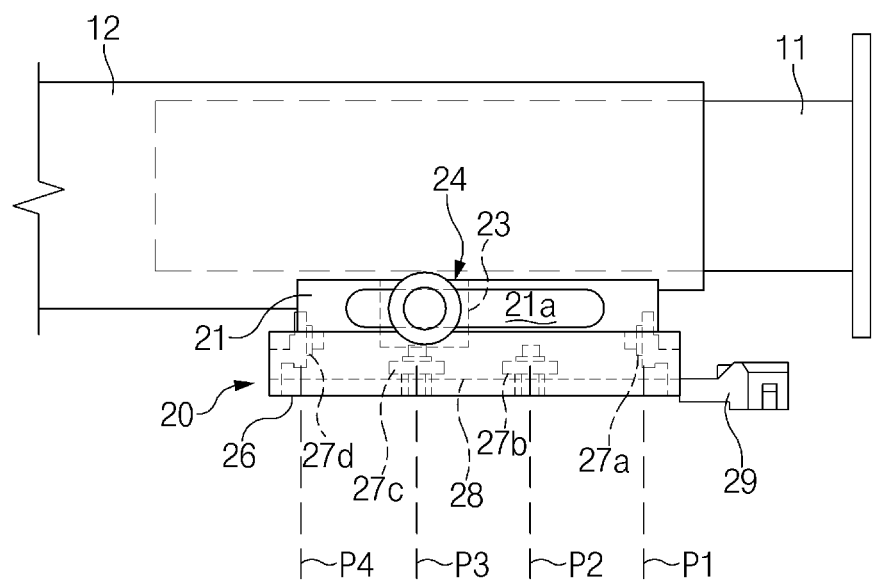
FIG. 10 is a view illustrating a state in which a third tact switch is turned on as the outer column moves in the steering column assembly of the integrated memory system for a driving position according to the exemplary embodiment of the present disclosure.

Referring to FIG. 10, when the outer column 12 moves toward the inner column 11 so that the length of the steering column 10 is third shortest, the push member 23 may push the button of the third tact switch 27c, which is positioned to be third closest to the inner column 11 among the plurality of tact switches 27a, 27b, 27c, and 27d to thus turn on the third tact switch 27c. Accordingly, the controller 110 may be configured to detect that the outer column 12 is positioned at the third detection position which is third closest to the lower end of the inner column 11.

Figure 11:
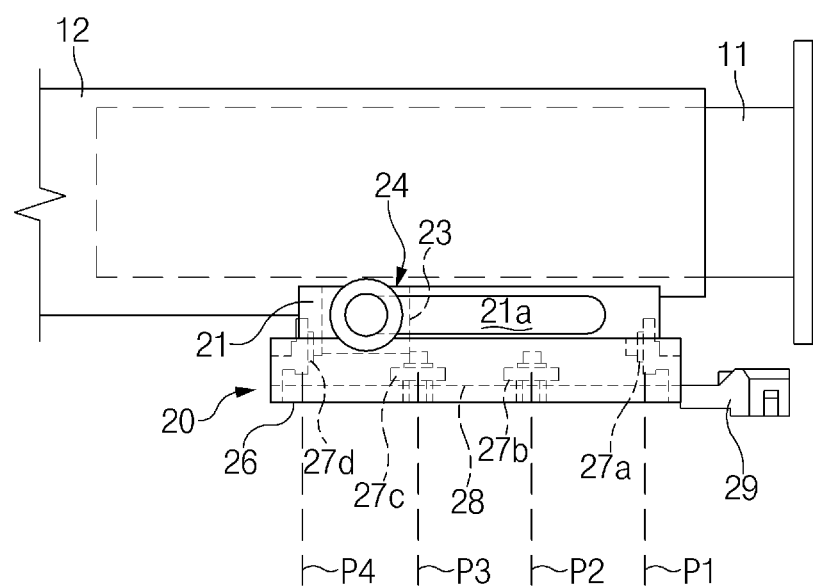
FIG. 11 is a view illustrating a state in which a fourth tact switch is turned on as the outer column moves in the steering column assembly of the integrated memory system for a driving position according to the exemplary embodiment of the present disclosure.

Referring to FIG. 11, when the outer column 12 moves away from the inner column 11 so that the length of the steering column 10 becomes longest, the push member 23 may push the button of the fourth tact switch 27d, which is positioned farthest from the inner column 11 among the plurality of tact switches 27a, 27b, 27c, and 27d to thus turn on the fourth tact switch 27d. Accordingly, the controller 110 may be configured to detect that the outer column 12 is positioned at the fourth detection position farthest from the lower end of the inner column 11.

According to the exemplary embodiment, the controller 110 may include a processor 111 and a memory 112, as illustrated in FIG. 1. The memory 112 stores instructions, which are executable by the processor 111, and data related to the instructions. The processor 111 may be configured to set and store a plurality of "driver setting data" based on a body type or demand of each driver and to recall or retrieve the driver setting data selected by the driver from the plurality of stored driver setting data.

Specifically, in response to the telescopic adjustment of the steering column 10 (i.e., the relative movement of the outer column 12 with respect to the inner column 11), the processor 111 may be configured to set and store the plurality of driver setting data and to recall or retrieve the driver setting data selected by each driver from the plurality of stored driver setting data. The respective driver setting data may include information about positions of a driver seat set to correspond to the respective detection positions, information about positions of outside mirrors set to correspond to the respective detection positions, information about brightness of a display set to correspond to the respective detection positions, and information about brightness of lights set to correspond to the respective detection positions.

Specifically, the position of the driver seat may be adjusted by a driver seat actuator 131 and a driver seat controller 113 based on the information about the positions of the driver seat which are set to correspond to the respective detection positions. The driver seat actuator 131 may be configured to move the driver seat in a longitudinal direction, a height direction, a width direction, and the like of a vehicle. The position of the outside mirror may be adjusted about a pivot axis of the outside mirror by an outside mirror actuator 132 and an outside mirror controller 114 based on the information about the positions of the outside mirror which are set to correspond to the respective detection positions. The outside mirror actuator 132 may be configured to rotate the outside mirror about the pivot axis.

The brightness of the display may be adjusted by a display driving circuit 133 and a display controller 115 based on the information about the brightness of the display which is set to correspond to the respective detection positions. The brightness of the light may be adjusted by a light driving circuit 134 and a light controller 116 based on the information about the brightness of the light which is set to correspond to the respective detection positions.

The driver seat controller 113 may include a processor 113a and a memory 113b, the processor 113a may be configured to operate the driver seat actuator 131, and the processor 111 of the controller 110 may be configured to store the information about the positions of the driver seat, which are set to correspond to the respective detection positions, in the memory 113b of the driver seat controller 113. The processor 111 of the controller 110 may be configured to generate a first control signal for recalling or retrieving the information about the positions of the driver seat stored in the memory 113*b* of the driver seat controller 113, and then transmit the first control signal to the driver seat controller 113. As the processor 113*a* of the driver seat controller 113 operates the driver seat actuator 131, the position of the driver seat may be adjusted based on the information about the positions of the driver seat set to correspond to the respective detection positions.

The outside mirror controller 114 may include a processor 114*a* and a memory 114*b*, the processor 114*a* may be configured to operate the outside mirror actuator 132, and the processor 111 of the controller 110 may be configured to store the information about the positions of the outside mirror, which are set to correspond to the respective detection positions, in the memory 114*b* of the outside mirror controller 114. The processor 111 of the controller 110 may be configured to generate a second control signal for recalling or retrieving the information about the positions of the outside mirror stored in the memory 114*b* of the outside mirror controller 114, and then transmit the second control signal to the outside mirror controller 114. As the processor 114*a* of the outside mirror controller 114 operates the outside mirror actuator 132, the position of the outside mirror may be adjusted based on the information about the positions of the outside mirror set to correspond to the respective detection positions.

The display controller 115 may include a processor 115*a* and a memory 115*b*, the processor 115*a* may be configured to operate a display driving circuit 133, and the processor 111 of the controller 110 may be configured to store the information about the brightness of the display, which is set to correspond to the respective detection positions, in the memory 115*b* of the display controller 115. The processor 111 of the controller 110 may be configured to generate a third control signal for recalling or retrieving the information about the brightness of the display stored in the memory 115*b* of the display controller 115, and then transmit the third control signal to the display controller 115. Therefore, as the processor 115*a* of the display controller 115 operates the display driving circuit 133, the brightness of the display may be adjusted based on the information about the brightness of the display set to correspond to the respective detection positions. For example, the display may be one or more display devices adjacent to the driver seat of the vehicle, such as an instrument cluster 120, a head-up display (HUD) disposed on a wind shield, an AVN (audio, video, and navigation) system, or a human machine interface (HMI).

The light controller 116 may include a processor 116*a* and a memory 116*b*, the processor 116*a* may be configured to operate a light driving circuit 134, and the processor 111 of the controller 110 may be configured to store the information about the brightness of the light, which is set to correspond to the respective detection positions, in the memory 116*b* of the light controller 116. The processor 111 of the controller 110 may be configured to generate a fourth control signal for recalling or retrieving the information about the brightness of the light stored in the memory 116*b* of the light controller 116, and then transmit the fourth control signal to the light controller 116.

Therefore, as the processor 116*a* of the light controller 116 operates the light driving circuit 134, the brightness of the light may be adjusted based on the information about the brightness of the display set to correspond to the respective detection positions. For example, the lights may include one or more lighting devices, such as a warning signal lamp and an indicator light, adjacent to the driver seat of the vehicle, and at least some of the lighting devices may use a rheostat to more accurately adjust brightness thereof.

According to the exemplary embodiment illustrated in FIG. 1, the controller 110 of the integrated memory system 100 for a driving position may be a hardware module configured independently of the external controllers 113, 114, 115, and 116 such as the driver seat controller 113, the outside mirror controller 114, the display controller 115, and the light controller 116. The processor 111 may be configured to set the plurality of driver setting data individually corresponding to the plurality of detection positions P1, P2, P3, and P4 and to individually store the plurality of set driver setting data in the memories 113*b*, 114*b*, 115*b*, and 116*b* of the respective external controllers 113, 114, 115, and 116.

The processor 111 of the controller 110 may be configured to detect the relative position of the outer column 12 with respect to the inner column 11 based on any one detection position among the plurality of detection positions P1, P2, P3, and P4. Therefore, the processor 111 may be configured to select the driver setting data corresponding to the detection position. Further, the processor 111 may be configured to generate and transmit a control signal for individually recalling or retrieving the plurality of driver setting data stored in the memories 113*b*, 114*b*, 115*b*, and 116*b* of the respective external controllers 113, 114, 115, and 116.

Figure 2:
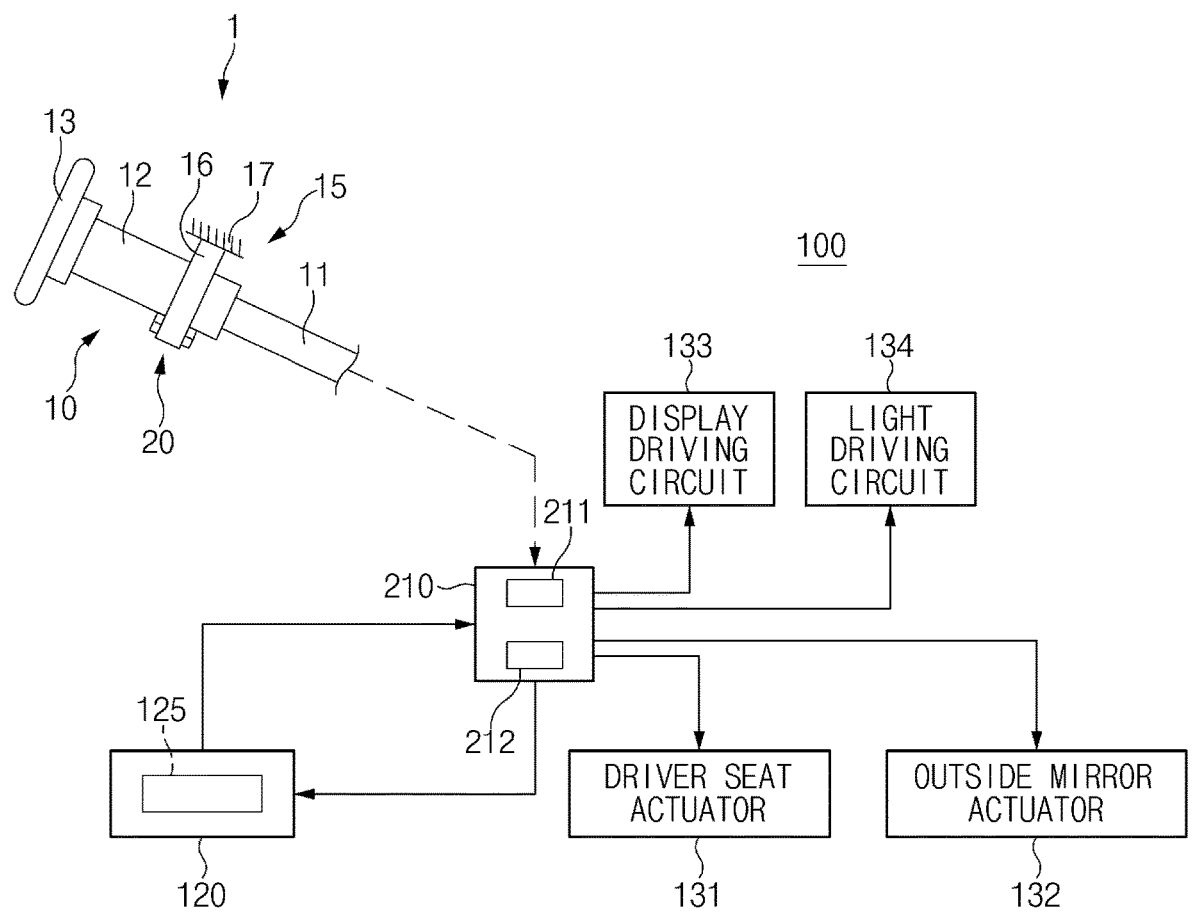
FIG. 2 is a view illustrating an integrated memory system for a driving position according to another exemplary embodiment of the present disclosure.

According to another exemplary embodiment, as illustrated in FIG. 2, a controller 210 may be an integrated controller including the driver seat controller, the outside mirror controller, the display controller, and the light controller. The controller 200 may include a processor 211 configured to individually operate the driver seat actuator 131, the outside mirror actuator 132, the display driving circuit 133, and the light driving circuit 134, and a memory 212 configured to store instructions executable by the processor 211, data, and the like.

The memory 212 may be configured to store the instructions executable by the processor 211, the data related to the instructions, and the plurality of "driver setting data" set to be adapted to the body type of each driver. The plurality of driver setting data may be set to correspond individually to the plurality of detection positions by the processor 211. The respective "driver setting data" may include the information about the positions of the driver seat, the information about the positions of the outside mirror, the information about the brightness of the display, and the information about the brightness of the light which correspond to the respective detection positions.

In response to the telescopic adjustment of the steering column 10 (i.e., the relative movement of the outer column 12 with respect to the inner column 11), the processor 211 may be configured to set the plurality of "driver setting data", store the plurality of set driver setting data in the memory 212, and recall or retrieve the driver setting data selected by the user from the plurality of driver setting data modes stored in the memory 212.

Specifically, when the relative position of the outer column 12 is adjusted with respect to the inner column 11 as the driver moves the outer column 12 in the axis direction with respect to the inner column 11, the controller 210 may be configured to detect the relative position of the outer column 12 with respect to the inner column 11 based on any one detection position among the plurality of detection positions. In accordance with the corresponding detection position, the controller 210 may be configured to adjust the position of the driver seat, the position of the outside mirror, the brightness of the display, and the brightness of the light.

The processor 211 may be configured to set the plurality of driver setting data individually corresponding to the plurality of detection positions P1, P2, P3, and P4 and to store the plurality of set driver setting data in the memory 212. The processor 211 may be configured to detect the relative position of the outer column 12 with respect to the inner column 11 based on any one detection position among the plurality of detection positions P1, P2, P3, and P4. Therefore, the processor 211 may be configured to select the driver setting data corresponding to the detection position. Further, the processor 211 may be configured to generate and transmit control signals for individually recalling or retrieving the plurality of driver setting data stored in the memory 212.

Referring to FIG. 2, the processor 211 may be configured to generate the first control signal for recalling or retrieving the information about the positions of the driver seat stored in the memory 212 and transmit the first control signal to the driver seat actuator 131, such that the driver seat actuator 131 may automatically adjust the position of the driver seat. The processor 211 may be configured to transmit the second control signal, which corresponds to the information about the position of the outside mirror included in the selected driver setting data, to the outside mirror actuator 132, such that the outside mirror actuator 132 may automatically adjust the position of the outside mirror. The processor 211 may be configured to generate the third control signal corresponding to the information about the brightness of the display included in the selected driver setting data and transmit the third control signal to the display driving circuit 133, such that the display driving circuit 133 may automatically adjust the brightness of the display.

For example, the processor 211 may be configured to adjust brightness of various displays such as the instrument cluster 120 positioned in front of the driver seat, the head-up display (HUD) disposed on the wind shield, the AVN (audio, video, and navigation) system, and the human machine interface (HMI). In addition, the processor 211 may be configured to generate the fourth control signal corresponding to the information about the brightness of the light included in the selected driver setting data and transmit the fourth control signal to the light driving circuit 134, such that the light driving circuit 134 may automatically adjust the brightness of the light. For example, the processor 211 may be configured to adjust brightness of various lights such as the warning signal lamp and the indicator light, and at least some of the lights may use a rheostat to more accurately adjust brightness thereof.

Figure 12:
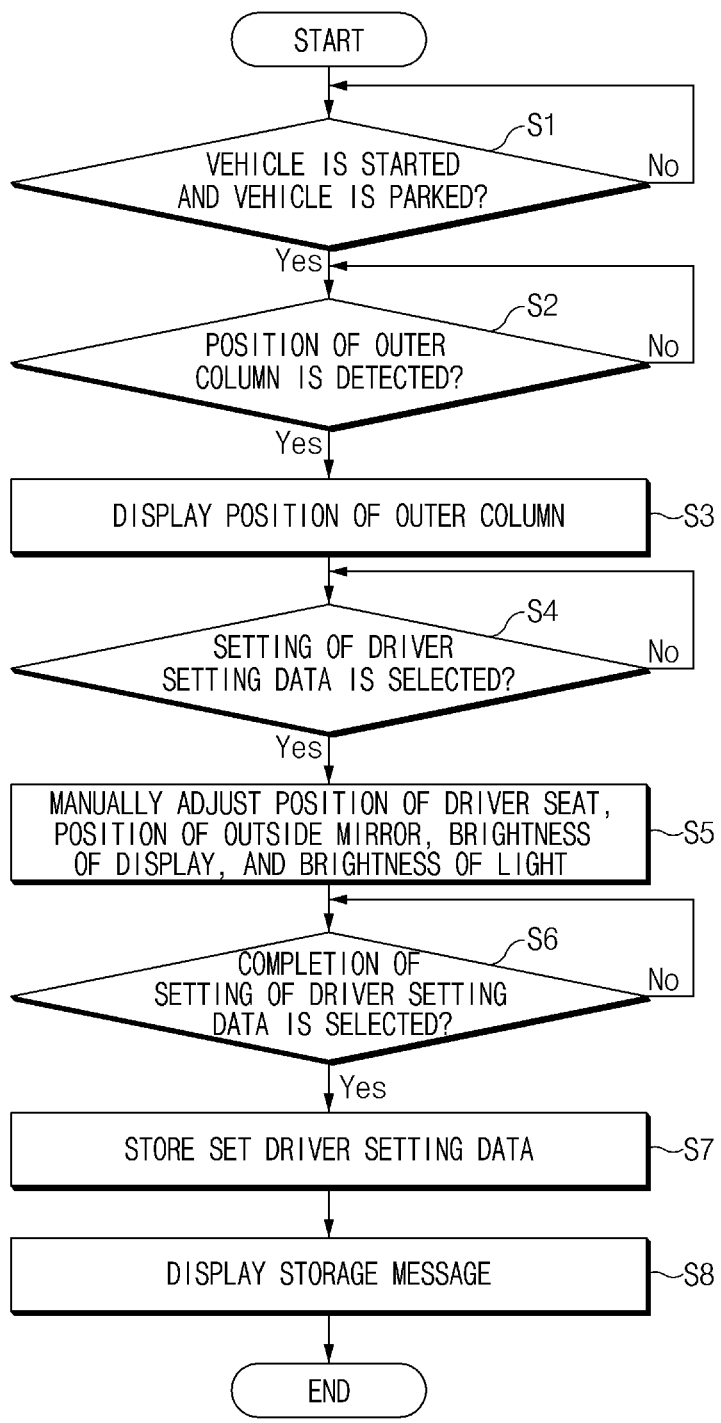
FIG. 12 is a flowchart illustrating a method of setting and storing driver setting data by using the integrated memory system for a driving position according to the exemplary embodiment of the present disclosure.
Figure 13:
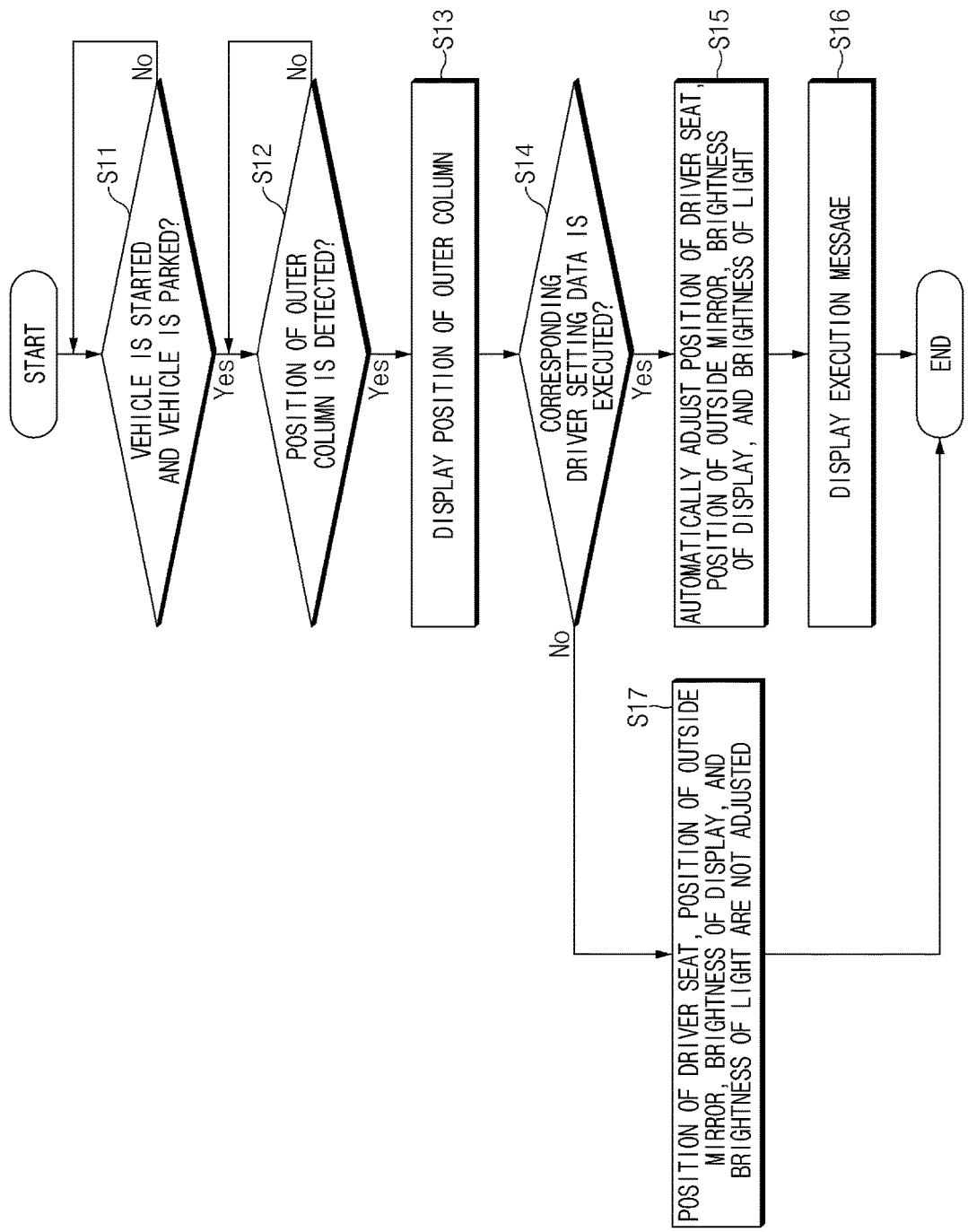
FIG. 13 is a flowchart illustrating a method of recalling or retrieving the driver setting data set and stored by using the integrated memory system for a driving position according to the exemplary embodiment of the present disclosure.

FIGS. 12 and 13 are views illustrating a method of controlling the integrated memory system for driver setting data according to the exemplary embodiment of the present disclosure. FIG. 12 illustrates a method of setting the driver setting data using the integrated memory system for driver setting data according to the exemplary embodiment of the present disclosure, and FIG. 13 illustrates a process of recalling or retrieving the set driver setting data. The method of setting the driver setting data using the integrated memory system for driver setting data will be described below in detail with reference to FIG. 12.

The controllers 110 and 210 may be configured to determine whether the vehicle is started and whether the vehicle is parked (S1). In particular, the controllers 110 and 210 may be configured to determine whether the vehicle is started by detecting whether an internal combustion engine or an electric motor of the vehicle is turned on. In addition, the controllers 110 and 210 may be configured to determine whether the vehicle is parked by detecting whether a transmission lever is positioned at a park position. In response to determining in step S1 that the vehicle is neither started nor parked, the process may return back to the start step or may end.

In response to determining in step S1 that the vehicle is started and parked, the controllers 110 and 210 may be configured to determine whether the position of the outer column 12 with respect to the inner column 11 based on the movement of the outer column 12 is detected by the position detecting unit 20 (S2). The driver moves the outer column 12 in the axis direction with respect to the inner column 11 based on personal driving characteristics such as the body type or the demand of the driver, such that the driver may select the relative position of the outer column 12 with respect to the inner column 11. The controllers 110 and 210 may be configured to detect the relative position of the outer column 12 with respect to the inner column 11 (hereinafter, referred to as 'the relative position of the outer column 12') by detecting that any one of the plurality of tact switches 27a, 27b, 27c, and 27d is turned on by the push member 23.

The driver adjusts the steering column 10 in a telescopic manner based on personal driving characteristics such as the body type or the demand of the driver, such that the driver may select the relative position of the outer column 12 with respect to the inner column 11. When the outer column 12 is moved in the axis direction with respect to the inner column 11 and thus the push member 23 pushes the button of any one of the tact switches 27a, 27b, 27c, and 27d, the turn-on signal related to the corresponding tact switch is transmitted to the controllers 110 and 210, such that the controllers 110 and 210 may be configured to detect that any one of the plurality of tact switches 27a, 27b, 27c, and 27d is turned on. Therefore, the controllers 110 and 210 may be configured to detect the relative position of the outer column 12 based on the detection position defined by the turned-on tact switch. When the relative position of the outer column 12 is not detected by the position detecting unit 20 in step S2, the process may return back to the previous step or may end.

When the relative position of the outer column 12 is detected by the position detecting unit 20 in step S2, the processors 111 and 211 of the controllers 110 and 210 may be configured to display the relative position of the outer column 12 on a user setting mode 125 of the instrument cluster 120 (S3). For example, when the push member 23 pushes the button of the first tact switch 27a, the controllers 110 and 210 may be configured to display, on the user setting mode 125 of the instrument cluster 120, that the relative position of the outer column 12 is at the "first detection position P1". When the push member 23 pushes the button of the second tact switch 27b, the controllers 110 and 210 may be configured to display, on the user setting mode 125 of the instrument cluster 120, that the relative position of the outer column 12 is at the "second detection position P2".

When the push member 23 pushes the button of the third tact switch 27c, the controllers 110 and 210 may be configured to display, on the user setting mode 125 of the instrument cluster 120, that the relative position of the outer column 12 is at the "third detection position P3". When the push member 23 pushed the button of the fourth tact switch 27d, the controllers 110 and 210 may be configured to display, on the user setting mode 125 of the instrument cluster 120, that the relative position of the outer column 12 is at the "fourth detection position P4".

When the relative position of the outer column 12 is displayed on the instrument cluster 120, the controllers 110 and 210 may be configured to determine whether the driver selects the setting of the "driver setting data" on the user setting mode of the instrument cluster 120 (S4). When the setting of the driver setting data is not selected in step S4, the process may return back to the previous step or may end. When the setting of the "driver setting data" is selected in step S4, the driver manually adjusts the position of the driver seat, the position of the outside mirror, the brightness of the display, the brightness of the light, and the like (S5).

After the position of the driver seat, the position of the outside mirror, the brightness of the display, the brightness of the light, and the like are manually adjusted by the driver, the controllers 110 and 210 determine whether the driver selects the completion of setting of the corresponding "driver setting data" on the user setting mode of the instrument cluster 120 (S6).

When the completion of setting of the "driver setting data" is selected in step S6, the processors 111 and 211 of the controllers 110 and 210 may be configured to store the set "driver setting data" in the memories 113a, 114a, 115a, and 116a of the respective external controllers 113, 114, 115, and 116 illustrated in FIG. 1 or the memory 212 illustrated in FIG. 2 (S7). Thereafter, a message indicating that the "driver setting data" corresponding to the detection position are set and stored may be displayed on the instrument cluster 120 (S8).

When the completion of setting of the driver setting data is not selected in step S6, the process may return back to the previous step or may end. With the above-mentioned processes, the plurality of driver setting data corresponding to the plurality of detection positions may be set and stored. The method of recalling or retrieving the set driver setting data using the integrated memory system for driver setting data will be described below in detail with reference to FIG. 13.

The controller 110 may be configured to determine whether the vehicle is started and whether the vehicle is parked (S11). In particular, the controller 110 may be configured to determine whether the vehicle is started by detecting whether the internal combustion engine or the electric motor of the vehicle is turned on. Additionally, the controller 110 may be configured to determine whether the vehicle is parked by detecting whether the transmission lever is positioned at the park position. In response to determining in step S11 that the vehicle is neither started nor parked, the process may return back to the start step or may end.

In response to determining in step S11 that the vehicle is started and parked, the controller 110 may be configured to determine whether the relative position of the outer column 12 based on the movement of the outer column 12 is detected by the position detecting unit 20 (S12). In other words, the controller 110 may be configured to detect whether the push member 23 of the outer column 12 is positioned at any one detection position among the plurality of detection positions P1, P2, P3, and P4. Specifically, in order for the driver to adjust the steering column 10 in a telescopic manner in accordance with his/her body type, the outer column 12 moves in the axis direction relative to the inner column 11, and the push member 23 of the outer column 12 thus pushes the button of any one of the tact switches 27a, 27b, 27c, and 27d, such that the turn-on signal related to the corresponding tact switch is transmitted to the controllers 110 and 210, and the controllers 110 and 210 may be configured to detect that any one of the plurality of tact switches 27a, 27b, 27c, and 27d is turned on. Therefore, the controllers 110 and 210 may be configured to detect the relative position of the outer column 12 based on the turned-on tact switch. When the relative position of the outer column 12 is not detected by the position detecting unit 20 in step S12, the process may return back to the previous step or may end.

When the relative position of the outer column 12 is detected by the position detecting unit 20 in step S12, the controllers 110 and 210 may be configured to display, on the user setting mode 125 of the instrument cluster 120, "the detection position at which the relative position of the outer column 12 is detected (S13)". For example, when the push member 23 pushes the button of the first tact switch 27a, the controllers 110 and 210 may be configured to display, on the user setting mode 125 of the instrument cluster 120, that the relative position of the outer column 12 is detected based on the "first detection position P1".

When the push member 23 pushes the button of the second tact switch 27b, the controllers 110 and 210 may be configured to display, on the user setting mode 125 of the instrument cluster 120, that the relative position of the outer column 12 is detected based on the "second detection position P2". When the push member 23 pushes the button of the third tact switch 27c, the controllers 110 and 210 may be configured to display, on the user setting mode 125 of the instrument cluster 120, that the relative position of the outer column 12 is detected based on the "third detection position P3". When the push member 23 pushes the button of the fourth tact switch 27d, the controllers 110 and 210 may be configured to display, on the user setting mode 125 of the instrument cluster 120, that the relative position of the outer column 12 is detected based on the "fourth detection position P4".

As the relative position of the outer column 12 is displayed on the user setting mode 125 of the instrument cluster 120, the controllers 110 and 210 may be configured to select the driver setting data, which correspond to the detection position at which the outer column 12 is currently positioned, among the plurality of driver setting data stored in the memory. The controllers 110 and 210 may be configured to determine whether the driver executes the driver setting data selected on the user setting mode 125 of the instrument cluster 120 (S14).

When the driver selects the execution of the driver setting data on the user setting mode 125 of the instrument cluster 120 in step S14, the processors 111 and 211 of the controllers 110 and 210 may be configured to recall or retrieve the driver setting data selected from the plurality of driver setting data stored in the memories 113a, 114a, 115a, and 116a of the respective external controllers 113, 114, 115, and 116 illustrated in FIG. 1 or the memory 212 illustrated in FIG. 2 (S15). When the processors 111 and 211 recall or retrieve the selected driver setting data, the processors 111 and 211 may be configured to transmit the control signals to the driver seat actuator 131, the outside mirror actuator 132, the display driving circuit 133, and the light driving circuit 134, such that the position of the driver seat, the position of the outside mirror, the brightness of the display, the brightness of the light, and the like may be adjusted automatically. Thereafter, a message indicating that "the selected driver setting data were executed" may be displayed on the user setting mode 125 of the instrument cluster 120 (S16).

When the driver does not select the execution of the driver setting data selected on the user setting mode 125 of the instrument cluster 120 in step S14, the processors 111 and 211 of the controllers 110 and 210 do not operate the driver seat actuator 131, the outside mirror actuator 132, the display driving circuit 133, and the light driving circuit 134, such that the position of the driver seat, the position of the outside mirror, the brightness of the display, the brightness of the light, and the like are not adjusted (S17). In other words, when the execution of the driver setting data is not selected, the processors 111 and 211 of the controllers 110 and 210 do not recall or retrieve the driver setting data stored in the memory.

According to the present disclosure configured as described above, with the adjustment of the steering column in a telescopic manner, it may be possible to set and store the driver setting data (e.g., including the information about the positions of the driver seat, the information about the positions of the outside mirror, the information about the brightness of the display, and the information of the brightness of the light) suitable for the driver's body type, and recall or retrieve the set and stored driver setting data, and it may be possible to remove a driving motor for moving the steering column in the related art and remove a separate manipulation unit (a switch assembly) for setting and recalling or retrieving the driver setting data, thereby reducing manufacturing costs. In particular, with the adjustment of the steering column in a telescopic manner, it may be possible to set, store, recall, or retrieve the driver setting data, such that a separate operation of a switch is not required unlike the related art, thereby improving convenience of manipulation.

The above description is simply given for illustratively describing the technical spirit of the present disclosure, and those skilled in the art to which the present disclosure pertains will appreciate that various changes and modifications are possible without departing from the essential characteristic of the present disclosure.

Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical spirit in the equivalent scope thereto should be construed as falling within the scope of the present disclosure.

What is claimed is:

1. An integrated memory system for a driving position, comprising:
   a steering column including an inner column, and an outer column movable in an axis direction relative to the inner column;
   a position detecting unit including a plurality of detection positions and configured to detect a relative position of the outer column with respect to the inner column in response to a movement of the outer column; and
   a controller connected to the position detecting unit and configured to set a plurality of driver setting data individually corresponding to the plurality of detection positions;
   wherein the driver setting data includes information about positions of a driver seat which correspond to the respective detection positions; and
   wherein the position detecting unit includes:
   a housing mounted on the outer column;
   a plurality of tact switches mounted in the housing; and
   a push member connected to a vehicle body and configured to selectively push a button of any one tact switch among the plurality of tact switches in response to the movement of the outer column.

2. The integrated memory system of claim 1, wherein the controller is configured to generate a control signal for recalling or retrieving the driver setting data selected from the plurality of driver setting data.

3. The integrated memory system of claim 1, wherein the driver setting data further includes information about positions of an outside mirror corresponding to the respective detection positions, information about brightness of one or more displays corresponding to the respective detection positions, and information about brightness of one or more lights corresponding to the respective detection positions.

4. The integrated memory system of claim 1, wherein a longitudinal axis of the housing is parallel to a longitudinal axis of the outer column.

5. The integrated memory system of claim 1, wherein the plurality of tact switches is spaced apart from one another at an equal interval in a longitudinal direction of the outer column.

6. The integrated memory system of claim 1, wherein the plurality of detection positions are individually defined by the plurality of tact switches.

7. The integrated memory system of claim 1, wherein the push member is connected to the vehicle body through a bracket and disposed to be spaced apart from the outer column.

8. The integrated memory system of claim 7, wherein the outer column has two mounting legs spaced apart from each other, and the housing is separably coupled to the two mounting legs.

9. The integrated memory system of claim 8, wherein each of the mounting legs has a mounting groove, and the housing includes a plurality of lances each having a mounting hook to be coupled to the mounting groove.

10. The integrated memory system of claim 9, wherein the push member is connected to the bracket via a fixing pin, each of the mounting legs has a slot extending in a longitudinal direction of the outer column, and the fixing pin is guided along the slot of each of the mounting legs when the outer column moves.

11. A method of controlling an integrated memory system for a driving position, the integrated memory system including: an inner column; and an outer column configured to be movable in an axis direction relative to the inner column, the method comprising:
   detecting, by a controller, a relative position of the outer column with respect to the inner column based on a movement of the outer column based on a plurality of detection positions; and
   setting, by the controller, driver setting data based on the respective detection positions,
   wherein the driver setting data includes information about positions of a driver seat corresponding to the respective detection positions, information about positions of an outside mirror corresponding to the respective detection positions, information about brightness of one or more displays corresponding to the respective detection positions, and information about brightness of one or more lights corresponding to the respective detection positions.

12. The method of claim 11, further comprising:
   selecting, by the controller, the driver setting data corresponding to any one of the detection positions in response to detecting the relative position of the outer column with respect to the inner column based on any one detection position among the plurality of detection positions; and recalling, by the controller, or retrieving the selected driver setting data.

\* \* \* \* \*